Jan. 11, 1966    M. C. YEASTING    3,228,517
APPARATUS FOR CONVEYING POWDERY MATERIAL
Filed June 7, 1963
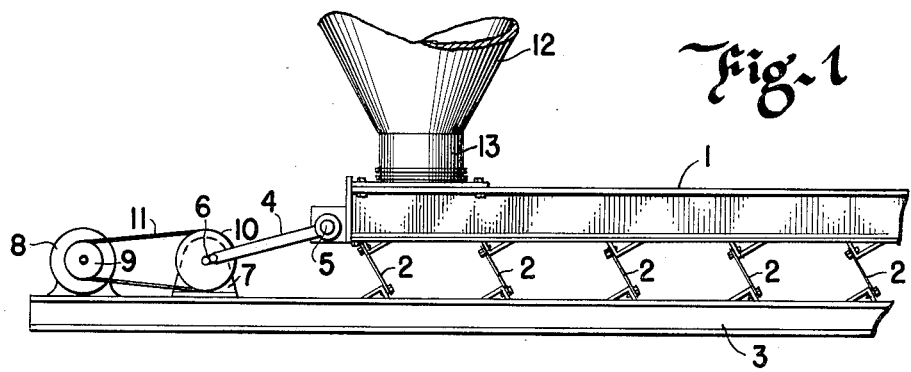
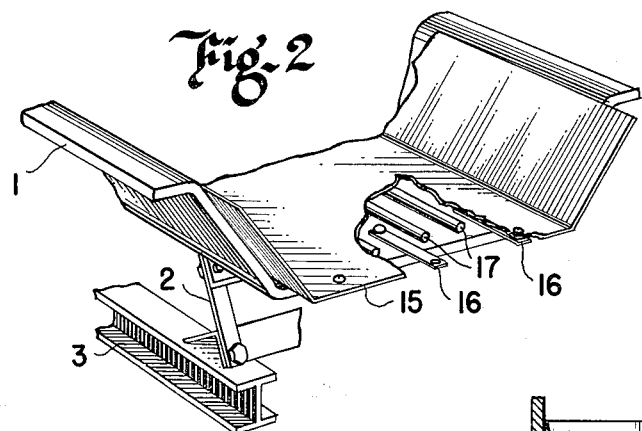
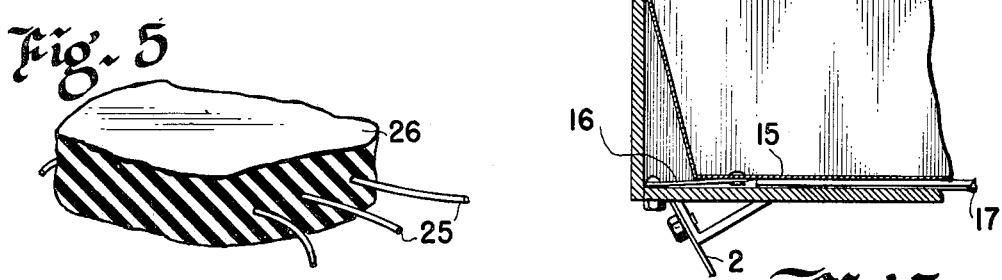
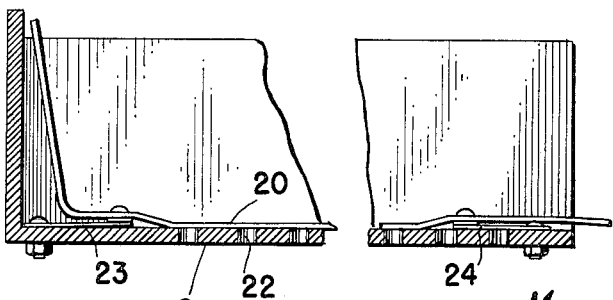
INVENTOR.
MAYNARD C. YEASTING
BY
Marshall, Wilson & Yeasting
attorneys United States Patent Office 3,228,517
Patented Jan. 11, 1966

1

3,228,517
APPARATUS FOR CONVEYING POWDERY MATERIAL
Maynard C. Yeasting, Elmore, Ohio, assignor to Chain Belt Company, Milwaukee, Wis., a corporation of Wisconsin
Filed June 7, 1963, Ser. No. 286,333
9 Claims. (Cl. 198—220)

This invention relates to a method and apparatus for conveying fine powdery materials by vibration and in particular to a method of vibratory conveying in which the horizontal component of motion of the vibratory trough is substantially sinusoidal and in which the vertical motion of the trough is generally linear during its upward forward travel and approximates a free fall during its downward rearward travel.

Vibratory conveyors are used in many industrial processes where materials must be conveyed at a relatively slow rate, up to 90 feet per minute, and where the material is hot, abrasive, or has other characteristics that make it difficult to handle on belt conveyors or other types of conveying equipment. Materials that are granular or chunky may be easily conveyed by a vibratory motion but difficulty is experienced in conveying a fine powdery material such as Portland cement, flour or similar materials. The difficulty with these fine powdery materials on a vibratory conveyor is that the material tends to hug the conveyor deck, because of atmospheric pressure, during those portions of the cycle when the material should be thrown free of the deck. Because of this effect much of the conveying action of the vibration is lost and the material tends to move slowly.

The principal object of this invention is to provide a method of vibratory conveying of fine powdery materials by driving the conveyor trough through a vibratory path that provides a relatively high pressure between the trough and the conveyed material during the forward and upward motion of the conveyor and which, without substantial separation of material and trough, reduces the force between the material and the trough to practically zero, during the terminal portion of the forward motion of the vibratory cycle, all of the return motion, and an initial portion of the forward motion.

Another object of the invention is to provide a method and apparatus for vibratorily conveying fine powdery material without, at any time, producing a vacuum or sub-atmospheric pressure between the material and the conveyor deck or trough.

A still further object of the invention is to provide a vibratory conveyor, the material contacting portion of which is positively driven horizontally by the vibratory drive mechanism and which is tossed upwardly and allowed to freely fall by the vertical components of the vibratory drive motion.

A still further object of the invention is to provide a vibratory conveyor in which the material contacting surface of the conveyor tends to remain substantially in contact with the material throughout the vibratory cycle but in which the pressure between the material and the contacting surface is substantially zero during at least the major part of the return motion of the conveyor and preferably, during all of the return motion and the terminal portions of the forward motion and which pressure rises to a maximum during the intermediate portions of the forward motion of the cycle of vibration.

More specific objects and advantages are apparent from the following description of a preferred form of the invention.

According to the invention fine powdery material which may or may not be mixed with larger granular or lumpy materials is vibratorily conveyed by propelling the trough and material upwardly and forwardly and then drawing the trough backwardly toward the starting point while allowing it to drop in free fall from its maximum height back to the starting position. A preferred form of the structure for carrying out the invention comprises an ordinary inclined vibratory conveyor equipped with a material contacting trough or trough liner lying loosely within the framework or sub-trough of the conveyor and linked to such sub-trough by means preventing horizontal relative displacement while permitting vertical relative motion between the trough and the supporting sub-trough or framework.

A preferred form of the invention is illustrated in the accompanying drawings.

In the drawings:
FIGURE 1 is a side elevation of a vibratory conveyor of the type suitable for practicing the invention.
FIGURE 2 is an isometric view of the discharge end of the improved conveyor trough, with parts broken away to show one form of construction.
FIGURE 3 is a fragmentary vertical longitudinal section of the improved conveyor at the upstream or receiving end thereof.
FIGURE 4 is a fragmentary longitudinal section of the improved conveyor showing a modified form of the construction.
FIGURE 5 is a view of a fragment of a conveyor deck illustrating one form of longitudinal reinforcement.

These specific figures and the accompanying description are intended merely to illustrate the invention and not to impose limitations on its scope.

In a vibratory conveyor for conveying fine particles according to the invention the trough or surface contacting the powdery material is tossed upwardly and then allowed to fall downwardly in free fall at the same time that it is moved longitudinally. The longitudinal motion is synchronized with the vertical tossing so that, as the trough is tossed upwardly it is also moved forwardly and while it is falling freely it is also moved backwardly to slide beneath the powdery material during the time that both the trough and the material are in free fall. This type of motion may very readily be provided by an ordinary inclined throw vibratory conveyor by adding a second deck or trough as a liner in the main trough or sub-frame and attaching the added trough by means such as links or straps so that the added trough cannot move lengthwise of the conveyor but is free to be tossed free of the sub-trough by the vibratory motion. During the portions of the vibratory cycle that the liner is tossed free of the supporting trough it is accelerated downwardly by gravity in free fall the same as any material immediately thereabove. Since they are both subjected to the same acceleration there is no relative pressure between the liner and the conveyed material and therefore no frictional force. During this free fall time the liner can be readily moved longitudinally with respect to the material without requiring an appreciable separation between the liner and the material. Preferably this period of no pressure or free fall lasts until the conveyor is starting its next forward stroke and has acquired a substantial forward horizontal velocity at this time the powdery material and trough are again brought into firm contact and the powdery material is moved forwardly with the forward motion of the trough.

Good conveying is obtained when the vertical component of the acceleration of the deck is approximately 1.2 to 1.5 times the acceleration of gravity and the sub-frame and supporting trough move along an angle of attack of about 30° with respect to the horizontal. Smaller angles of attack may also be used providing the vertical component of the vibration is maintained at about the same magnitude. The lower angles of attack tend to give a higher conveying speed but also produce greater forces in the drive structure of the conveyor. When the conveyor is operated at these amplitudes of vibration the powdery material is pressed downwardly onto the conveyor trough liner and the liner onto the main trough or sub-frame with a maximum force of 2½ to 3 times the weight of the material during the intermediate portion of the forward stroke of the conveyor and is in free fall or a condition of zero pressure between the material and the liner during the terminal portions of the forward stroke, when the trough velocity is low, and during all of the return stroke when the trough is moving counter to the movement of the powdery material. Since there is no appreciable separation between the powdery material and the liner there is no sub-atmospheric pressure forcing the powdery material against the rearwardly moving liner or conveyor deck and thus retarding its forward motion.

A conveyor structure operating according to the invention, as illustrated in FIGURE 1, comprises a trough 1 supported on a series of inclined cantilever springs 2 erected from a stationary base 3. The conveyor is driven by a connecting rod 4 extending from a pivot 5 on the head end of the conveyor trough 1 to an eccentric portion of a crank shaft 6 journaled in a standard 7 erected from the base 3. The crank shaft or eccentric shaft 6 is driven by a motor 8 connected through pulleys 9, 10 and a belt 11.

Powdery material to be conveyed is fed to the conveyor through a hopper or duct 12 that preferably includes a flexible boot 13 connecting the hopper or duct 12 to the head end of the conveyor trough 1.

The conveyor trough 1 which, according to the invention, may be the principal conveyor trough or a sub-support carries a liner 15 (FIG. 2) which constiutes the material contacting portion of the conveyor. This liner 15 may be made of a resilient material such as rubber belting or a metallic material such as sheet metal. It is connected at each end to the conveyor trough 1 by flexible links or straps 16 (FIGURE 3) which allow vertical motion of the liner relative to the main conveyor trough 1 while preventing any longitudinal relative motion between the liner and the trough.

To prevent air pressure from interferring with the proper cyclical separation between the conveyor trough 1 and the liner 15 the space between these members is ventilated. This may be accomplished by providing longitudinal rods 17 serving as spacers to hold the liner 15 free of the conveyor trough 1 thus providing an air space which may readily expand or contract according to the relative motion between the liner and the trough. In addition to the rods 17 it is also desirable but not necessary that the conveyor trough 1 have a perforated deck to increase the air supply to the space between the deck and the liner. Any similar means of accomplishing this ventilation of this space is suitable. The liner 15 may have a corrugated under surface much like the tread on an automobile tire or a molded rubber door mat to provide an ample air space between the liner and the conveyor deck and at the same time provide substantially continuous support for the liner.

Instead of providing longitudinal ridges on the under side of the liner or the rods 17 a liner 20, FIGURE 4, may be supported directly on a conveyor trough deck 21 provided with perforations 22 that are large enough and closely enough spaced so that the liner 20 is free to move upwardly with respect to the conveyor trough deck 21 without hindrance.

FIGURE 4 also shows liner links or straps 23 and 24 arranged to stretch the liner longitudinally of the trough 21 and thus prevent any relative longitudinal motion between the liner and the trough.

Since it is essential to this method of conveying that the liner move horizontally with the supporting conveyor trough or conveyor deck and since relatively long conveyors are often required it is desirable to reinforce the liner in the longitudinal direction by inserting wires or cables 25 in the liner material 26 during the process of manufacture, these cables or wires provide a longitudinal stability for the liner without interfering with its transverse motion.

This arrangement of a free liner in a vibratory conveyor trough provides a vibratory conveying action that does not require appreciable separation between the conveyed material and the conveyor deck thereby avoiding difficult problems encountered when powdery materials are conveyed directly in contact with the vibratory conveyor trough executing inclined sinusoidal motion.

This particular structure thus provides a vibratory motion for the liner which serves as the conveyor for powdery material which motion is in an orbital path. The liner moves upwardly and forwardly along a generally straight inclined line and then moves backwardly and downwardly along a curved path the vertical component of which corresponds substantially to the free fall of the liner. Thus the liner may be said to follow a horizontal motion that corresponds to the horizontal component of vibration of an ordinary vibratory conveyor and a vertical component motion that corresponds to the vertical component of movement of an object resting on an ordinary vibratory conveyor. This combination of movements results in a frictional driving force applied from the conveyor to the load only during the intermediate portion of the forward movement of the conveyor and results in substantially zero pressure or zero force between the conveyor liner and the material during the terminal portions of the forward motion when the velocity is low and during all of the return motion.

Various modifications may be made in the particular structure of components of a vibratory conveyor operating according to the invention without departing from the spirit and scope of the invention.

Having described the invention, I claim:

1. In a vibratory conveyor, in combination, a conveyor trough, a support mounted for vibration along an inclined path, means for vibrating the support along the inclined path, said trough resting loosely on said support, and means acting longitudinally of the trough for restricting horizontal displacement of the trough relative to the vibrating support.

2. In a vibratory conveyor, in combination, a resiliently mounted support, means for vibrating the support along an inclined path, a conveyor trough cradled on the support, and means coupling the trough to the support longitudinally of the trough, said trough being free to lift vertically from the support in response to the vibration of the support.

3. In a vibrating conveyor, in combination, a resiliently mounted support, means for vibrating the support along an inclined path, a conveyor trough, and means coupling the trough to the support for the transmission of horizontally directed and vertically upwardly directed forces from the support to the trough.

4. In a vibratory conveyor, in combination, a conveyor trough adapted to receive material to be conveyed in a forward direction and means for vibrating the trough along a closed path in which the trough motion simulates a free fall during at least the rearward motion of the trough.

5. In a vibratory conveyor, in combination, a conveyor trough adapted to receive material to be conveyed in a forward direction, means for vibrating the trough vertically with a motion the downward stroke of which occurs with a substantially constant acceleration generally equal to the acceleration of gravity, and means for vibrating the trough longitudinally in synchronism with the vertical vibration.

6. In a vibratory conveyor, in combination, a conveyor trough adapted to receive material to be conveyed in a forward direction, a support, means for vibrating the support along an inclined path, said conveyor being cradled on the support, means coupling the support and trough for vibrating the trough horizontally, and means interposed between the trough and support for cushioning the re-engagement of the trough and support as the trough lifts in response to the vibration.

7. In a vibratory conveying apparatus, in combination, a trough support, means for vibrating the trough support along an inclined path, a trough liner carried in the trough support, means coupling the support and liner to restrict only horizontal motion therebetween, said liner being adapted to lift free of the trough support in response to the vibration thereof.

8. In a vibratory conveying apparatus, in combination, a trough, means for vibrating the trough along an inclined path, a liner carried loosely in the trough and adapted to move vertically with material being conveyed, and means coupling the liner to the trough to move the liner horizontally with the trough.

9. In a vibratory conveying apparatus, in combination, a trough, means for vibrating the trough along an inclined path with simple harmonic motion, a liner for the trough, said liner being free to lift from the trough in response to the vibration of the trough, and means coupling the liner to the trough.

References Cited by the Examiner
UNITED STATES PATENTS

| | | | |
|---|---|---|---|
| 2,332,600 | 10/1943 | Rapp | 198—220 |
| 3,087,602 | 4/1963 | Hinkle | 198—220 |

SAMUEL F. COLEMAN, *Primary Examiner.*

WILLIAM B. LA BORDE, *Examiner.*